INVENTOR
H. S. BLACK
BY Harry C. Hart
ATTORNEY

REDUCTION OF INTERFERENCE IN PULSE RECEPTION

Filed Oct. 21, 1953 2 Sheets-Sheet 2

INVENTOR
H. S. BLACK
BY Harry C. Hart
ATTORNEY 2,769,861

REDUCTION OF INTERFERENCE IN PULSE RECEPTION

Harold S. Black, New Providence, N. J., assignor to Bell Telephone Laboratories, Incorporated, a corporation of New York Application October 21, 1953, Serial No. 387,485

20 Claims. (Cl. 179—15.6)

The present invention relates to signaling through channels that distort the signal waves and to a method and means for compensating or correcting for the resulting distortion.

Distortion in a transmission channel is either linear or nonlinear. In the former the principle of superposition applies and, hence, no new frequency components are produced by the transmission channel. Moreover, waves of several frequencies, which are simultaneously present, add algebraically to give the resultant arrival wave. When the distortion is nonlinear, the principle of superposition may not be used to evaluate the response of the system. In the presence of nonlinear distortion there is, in addition, a multiplication of wave components which produces frequency components corresponding to the products.

The present invention deals only with linear distortion. In linear systems of some types and ranges of constants, the phase and amplitude distortion may be excessive. This excessive distortion results in arrival waves of forms that are different from those of the applied impulses during the respective periods corresponding to the duration of each applied impulse and, moreover, the wave form of each response also persists far beyond the time corresponding to the duration of an applied impulse. If, then, two impulses are applied to the sending end of the system with an interval of no impressed current between them, the arrival current or voltage wave may, for example, not fall to zero between the wave portions corresponding to the two sent impulses, but the receiver may have applied to it a voltage of some value more or less all the time, thereby rendering reception and interpretation of discrete impulses difficult. The arrival wave resulting from a single applied impulse may not only extend over into or even far beyond the time interval corresponding to the next sent impulse, but far an applied impulse of given polarity the arrival wave may undergo reversals of polarity during times later than the time corresponding to the duration of the sent impulse. Accordingly, an impulse applied to the system may give rise to transient effects that have the appearance of a whole succession of impulses.

The portion of the arrival wave which persists beyond the period of duration corresponding to that of the applied impulse is its "tail"; i. e., it is that part of the arrival wave in which the current or voltage should fall to zero but instead tends to fill up intervals that have been arbitrarily allotted to the identification of subsequent applied impulses. Thus the presence of the tail may introduce intersymbol interference.

An object of the present invention is to reduce intersymbol interference.

A system for generating a transient pulse of preassigned wave form which exactly duplicates the tail of an incoming pulse and for then combining it with the pulses of an incoming train in such a way as to cancel the tail of each pulse of the latter is shown in MacColl Patent 2,056,284. The system there shown, however, is open to the following objection. Each new tail-canceling pulse is deliberately made proportional in magnitude to one of the pulses of the incoming train as it is received. Inasmuch as the amplitude of a received pulse may be greater or less than its nominal value by virtue of interchannel interference or crosstalk, induction from unrelated systems and various other kinds of unwanted signals, which are always accumulated in the course of transmission, and any and all of which may be designated "noise," the locally generated pulse thus includes the effect of such noise. The apparatus therefore fails to accomplish its stated objectives in the presence of noise. Therefore, the higher the speed of signaling and consequently, the more elaborate and refined the tail-canceling arrangement, the greater the errors due to noise in the finally reconstructed signal. Indeed, it can be shown that, in the presence of noise, MacColl's apparatus may be unstable and may sing.

In accordance with the present invention, this defect is overcome by employing full quantization of the locally generated pulse. Thus, each incoming pulse initiates the generation of a local pulse that occurs at a predetermined instant and has a standard amplitude, namely, that one of a restricted number of different amplitudes assigned by the transmitter apparatus which is most nearly like the amplitude of the incoming pulse. In accordance with conventional quantization practices, the magnitude of the step between each of these preassigned amplitudes and the next is greater than twice the magnitude of the interference produced by noise encountered in transmission.

In other words, the present invention employs full regeneration of pulses, and the apparatus that constructs or synthesizes the tail-canceling transient is actuated, not by the incoming pulse as it is received, as in the MacColl patent, but by a fully regenerated pulse, i. e., a pulse that is correctly timed, wholly noise-free, and has precisely (except perhaps for a constant factor of proportionality) the amplitude of the pulse originally transmitted. Under these conditions, the transient wave which is generated is such as exactly to cancel, at predetermined sampling times, all intersymbol interference caused by the tail of the incoming pulse, insofar as it results from the action of the transmission medium, the uncanceled residue being due entirely to noise accumulated in the course of transmission. All effects of this noise are then removed by the regeneration process, provided the noise during each sampling interval is less than half a quantum step in magnitude.

The system of the present invention is reliable and stable, i. e., unlike its predecessor, it never sings.

The particular apparatus employed by MacColl to generate his tail-canceling transient comprises, for each incoming pulse of a group, a synchronous sampler, a condenser that is instantaneously charged by this sampler to a voltage proportional to the incoming pulse at the sampling instant, a synchronously driven cam that generates the desired wave as a mechanical displacement of its follower, and a potentiometer having a wiper arm that is linked to the cam follower and to the end terminals of which the condenser voltage is applied. This apparatus operates to multiply the condenser voltage by the cam shape function and to reproduce the product as a continuous electric signal for recombination with the incoming pulse. By reason of the intrinsic properties of this apparatus subgroup, it must be permitted to bring its operations for one incoming pulse to completion before commencing them for another incoming pulse. Consequently, MacColl requires as many independent subgroups, each comprising sampler, condenser, cam and potentiometer, as there are pulse positions into which the tail of a particular incoming pulse extends. With the application of modern high-speed pulse communication techniques to long lines, this number may well exceed ten to twenty pulse positions. Such a large number of independent apparatus subgroups is expensive in manufacture and awkward in operation.

Moreover, MacColl's objective is to signal at high speeds; in particular in excess of the so-called Nyquist signaling speed of 2B signal elements per second for a transmission bandwidth of B cycles per second. In a typical broad-band system (for example, a television channel), B might be of the order of at least several megacycles per second. MacColl, by the employment of apparatus that is inherently limited to low operating speeds, defeats his own purpose.

The present invention employs, instead of the multiplicity of apparatus subgroups, the elements of which are slow in operation, a single element which, in addition to being able to operate at high speeds, has the further property of information storage, as a consequence of which it may commence the generation of the tail-canceling transient for a later incoming pulse while its operations for an earlier incoming pulse are still in progress. Indeed, it can generate such tail-canceling transients for a large number of successive incoming pulses simultaneously. It can do so, and phase them, i. e., adjust them correctly on the time scale, without any interference between them. The apparatus which thus rapidly and simultaneously generates the required tail-canceling transient for each of a number of successive incoming pulses comprises a wave propagation device, for example, a delay line having a plurality of taps spaced along its length and means, such as an attenuator or an amplifier and a reversing switch associated with each tap, for effecting the correct adjustment of its output, both in amplitude and in polarity, relative to the outputs of the other taps. The new pulse which results from the regeneration operation being fed into the input point at one end of this device travels to the far end, where it is absorbed by a terminating impedance. As it passes each of the several taps, an output pulse appears on the latter; and the whole sequence of such output pulses constitutes the required tail-canceling transient. True, the latter has the correct value only at each of a series of discrete, brief intervals; but since these may be exactly identified as the sampling times, departures of the transient from the correct value for complete tail cancellation at other times are of no consequence.

In accordance with standard practice, either a band-pass or a low-pass filter is connected to the input terminals of the apparatus with the object of eliminating noise signals that lie in the frequency range not of interest. By virtue of the present approach to the problem of eliminating intersymbol interference, this low-pass filter may have a much lower cut-off frequency than is possible with other systems, and this reduction of the input filter bandwidth makes for further reduction of the extraneous noise.

While it is useful at any signaling speed, it is a feature of the apparatus thus far described that it permits signaling at speeds in excess of the Nyquist speed for any particular transmission medium with virtually complete elimination of intersymbol interference, and in the presence of noise, provided only that the magnitude of the noise during each sampling interval is less than half a single quantum step. This is the restriction to which pulse transmission systems generally are subject, and it is imposed on the present system for the same reasons which dictate it in general; namely, in order that repeater or receiver apparatus may correctly identify the nominal value of each arriving pulse as that of the nearest preset quantum level, and so may fully regenerate each pulse of an incoming train.

But the invention also provides noise reducer apparatus which, provided signaling is carried out at a speed in excess of the Nyquist speed (or at least sensibly in excess of twice the highest significant noise frequency), further reduces the noise to the extent that, before such reduction, it may be in excess of a half quantum step. Provided it is not too greatly in excess, the magnitude of the noise, after such reduction, is less than a half quantum step, whereupon full regeneration of the incoming pulses may take place as before. Thus the apparatus in effect permits high speed pulse communication, with full pulse regeneration, in the presence of noise of an amount that was heretofore believed to be intolerable.

The noise reducer effects a partial balance and cancellation of noise pulses, one against the other. In general, noise pulses occur in a completely random or haphazard fashion so that no reduction of noise power can be expected from any balancing of noise against noise. It will be shown below, however, that when noise pulses are transmitted through a medium of bandwidth B at a rate in excess of the Nyquist signaling speed of 2B such pulses per second, there is in fact a certain amount of correlation between each transmitted noise pulse and the next; i. e., the transmitted noise pulses are not wholly independent of each other. Their partial interdependence is turned to account, in accordance with the invention in one of its aspects, to permit of their partial cancellation. Moreover, as implied by the above description, when the statistical structure of the noise is such as to display predominantly low-frequency components so that noise samples taken at a speed substantially less than the Nyquist rate are strongly correlated, then for this type of noise the noise reducer produces useful reductions even though the speed of signaling is less than the Nyquist rate.

The invention will be fully apprehended from the following detailed description of certain illustrative embodiments thereof taken in connection with the appended drawings, in which.

Figure 1:
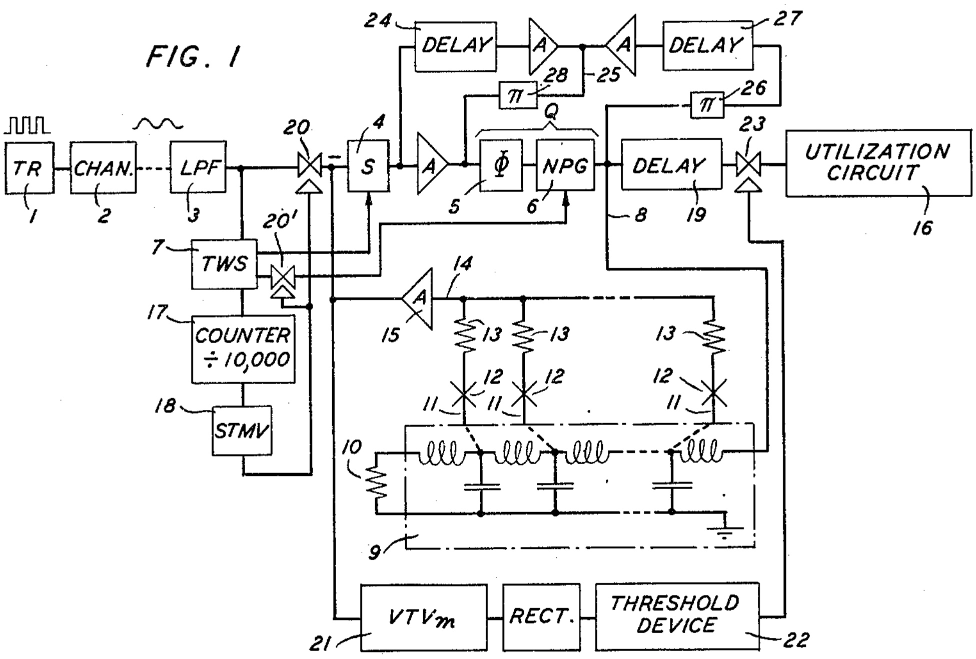
Fig. 1 is a block schematic diagram showing apparatus in accordance with the invention.

Referring now to the drawings, Fig. 1 is a block schematic diagram showing the apparatus of the invention. At a transmitter station which may be located at a great distance, a signal to be transmitted, for example, a voice wave, is converted by suitable apparatus 1 into a train of pulses that are quantized both in amplitude and in time of occurrence. That is to say, each pulse of the train, if present, is initiated only in one of a sequence of regularly occurring pulse positions and every signal sample, which may assume any magnitude within a continuous but bounded range, is represented by a pulse or a group of pulses, of which each one is restricted to the nearest one of a fixed number of discrete values. In a preferred example these values are two, namely, one positive and one negative, the magnitude of the signal sample being represented by a particular permutation (that is, pattern) of a predetermined number of positive and negative pulses. Such a system is known as a pulse code modulation system. A single pulse of such a group is shown in curve A of Fig. 2, and a representative train is shown in Fig. 3.

The pulse train so constructed is transmitted over a channel 2 that introduces attenuation that differs for the various frequency components of a signal. In other words, its loss-frequency characteristic is not flat. Moreover, its phase shift may not be proportional to frequency and free from phase distortion. Furthermore, in the course of transmission over this channel, the pulse train may accumulate noise. However, channel 2 either may or may not contain apparatus for amplifying the signals and regulating the transmission.

After transmission over the channel, the pulse train reaches the apparatus shown at the right-hand portion of the figure. In the absence of noise, each positive pulse as it arrives at the receiver station might, for example, have the form shown in curve B of Fig. 2, while the form of each negative pulse is at all times of opposite polarity, and might be the exact negative of curve B. In this received signal, it is obvious from its prolonged character that the interference between two adjacent pulses would evidently be so severe that special precautions must be taken in order to distinguish between them. Following a low-pass noise-elimination filter 3, a pulse regenerator is provided, comprising a sampler 4, an amplitude identifier 5, and a new pulse generator 6, and its first and last components are supplied with a sequence of sharp gating pulses that recur with high regularity at the basic pulse rate of the system and are preferably of uniform amplitude. They are generated by a timing wave source 7 and are supplied to the components 4, 6 of the pulse regenerator to control the regeneration in time of the incoming pulse train. In general, there will be an optimum time to sample, depending on the speed of signaling and the overall response of the system to an impulse. Accordingly, the sampler 4 operates to take a brief sample of the amplitude of the signal supplied to it. If the objective is to signal at the highest speed possible, this sample is taken at the earliest moment at which the signal can be unambiguously identified. If the objective is to signal at a slower rate, the sample is taken at that time at which, from the standpoint of signal-to-noise ratio, it is least disturbed by early portions of other pulses of the train. This signal sample is applied to the amplitude identifier 5 which acts to reduce the signal sample to the nearest one of a restricted number of different values; in the present example, to a pulse of positive amplitude, or to one of negative amplitude. This serves in the present example to eliminate all effects of noise provided the magnitude of the noise is less than the magnitude of the pulse at the time of sampling. To eliminate all effects of noise in the more general case, the magnitude of the noise during the sampling interval must be less than half a quantum step. The resulting identified pulse actuates or trips the new pulse generator 6 which delivers a pulse that is standardized in all respects; it is of standard amplitude, it is of standard duration, and it occurs in time coincidence with one of the timing pulses of the timing pulse generator 7. Thus the identifier 5 and the new pulse generator 6, acting together, comprise a quantizer.

Figures 4, 6:
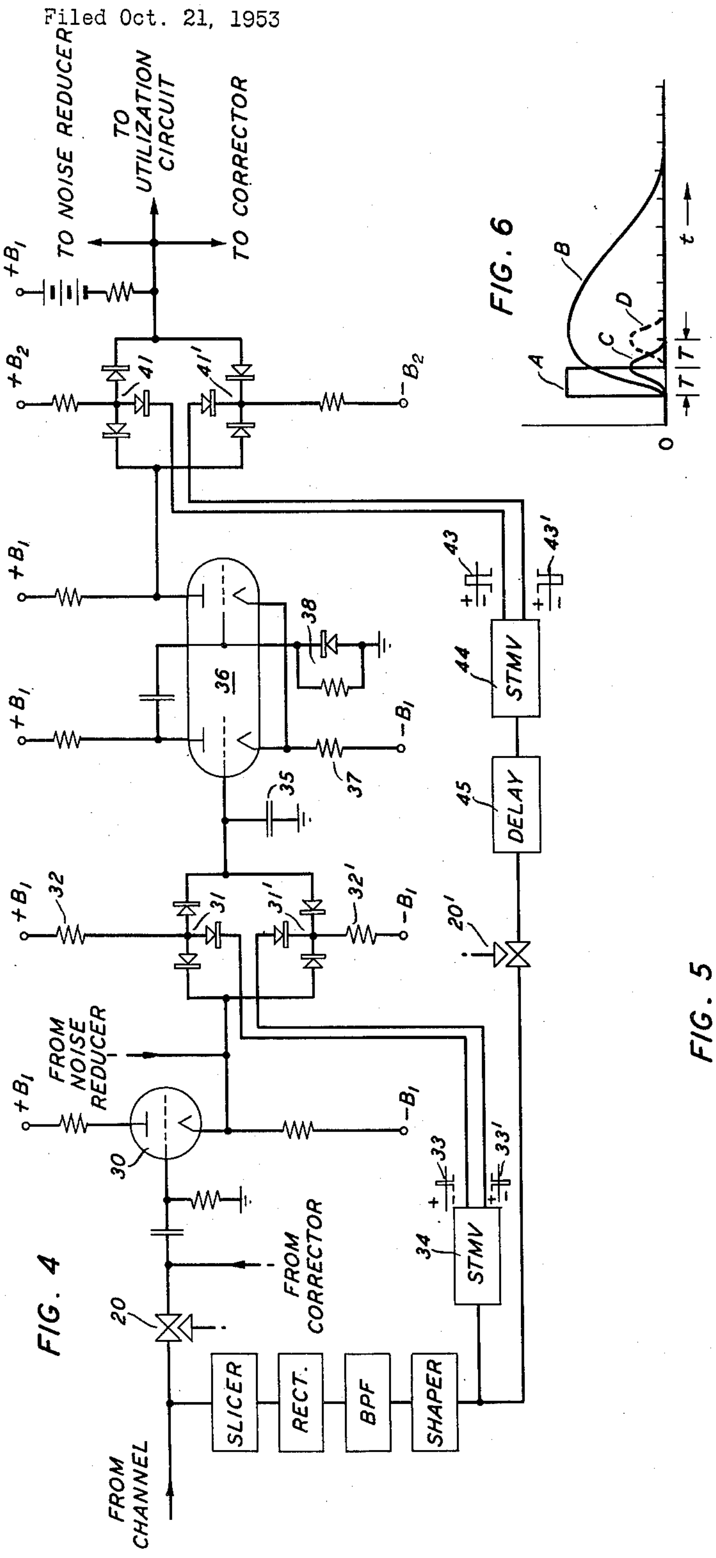
Fig. 4 is a schematic circuit diagram showing details for a part of Fig. 1.

Each of the various component elements of which this part of the circuit is formed may have various alternative constructions. The circuit details of one appropriate alternative for each such element are shown in Fig. 4. Here the incoming signals are first applied by way of a blocking condenser to the control grid of a cathode follower tube 30 which serves as a buffer. Its output is applied to the input points of two triple-diode gates 31, 31′ in parallel. These may be as described in Meacham Patent 2,576,026. The conductor of the one gate which is common to its three diodes is connected by way of a resistor 32 to a positive potential source, and the corresponding conductor of the other gate is similarly connected to a negative potential source. Sharp positive going pulses 33 and negative going pulses 33′ are applied respectively to the timing wave input points of these gates. The positive going pulses operate to take brief samples of the incoming signal when it is of positive polarity and the negative going timing pulses take similar brief samples of the incoming signal when it is of negative polarity.

The incoming signal pulse train contains a component of the basic timing rate and this is isolated by being applied to the timing wave source 7 which may comprise a slicer, a rectifier, a band-pass filter, tuned to the basic timing rate, and a shaper. The pulses thus derived are applied to a single trip multivibrator 34 having two output points, from one of which are derived the positive going timing pulses 33 for application to the sampling gate 31, and from the other of which the negative going timing pulses 33′ are derived for application to the gate 31′. In accordance with known techniques, the return time of the multivibrator 34 may be adjusted, by appropriate proportioning of its internal elements, to give very short sharp pulses 33, 33′ at each of its output points.

The incoming signal samples as thus derived are now applied by way of a holding condenser 35 to the input terminal of a slicer 36 which may be as described in Meacham Patent 2,537,843. It comprises two triodes which as a matter of convenience may be within a single envelope. Of these the anodes are connected by way of individual resistors to a positive potential source $+B_1$ while the cathodes are connected by way of a common resistor 37 to a negative potential source $B_1$. The anode of the first triode is coupled by way of a condenser to the grid of the second which is returned to ground by way of a parallel combination 38 of a resistor and a rectifier which acts to adjust the normal steady potentials. The grid of the first triode is returned to the positive and negative terminals of the potential sources by way of the parallel gate circuits 31, 31′. The holding condenser 35 connected in parallel with the first grid and to ground acts to lengthen out each pulse applied to the slicer 36 until its magnitude is changed.

The output of the slicer 36, taken from the anode of the second tube, is of constant amplitude, positive or negative with respect to anode potential $+B_1$, for the full duration of each pulse interval and of a sign determined by the sign of the pulse of the incoming train, Fig. 3. This potential condition is applied to the input point of a parallel pair of triple-diode gates 41, 41′ which, like the first pair 31, 31′ may be as described in Meacham Patent 2,576,026. Short sharp sampling pulses 43, 43′ are applied to the timing wave input points of these gates. They may be derived from the positive and negative output points, respectively, of a second single trip multivibrator 44 which may be of the same construction as the first single trip multivibrator and operates in the same way under the control of basic timing rate pulses derived from the timing wave source 7. The return time of the multivibrator 44 is preferably somewhat longer than that of the first single trip multivibrator 34, resulting in output timing pulses of somewhat greater duration. This ensures that correcting pulses, derived as described below, shall overlap the timing pulses applied to gates 31, 31′ of the first sampler 4. A delay device 45 is interposed to compensate for the delay introduced by the slicer 36.

The pulses appearing at the output point of this pair of gates 41, 41′ are thus short sharp pulses of durations determined by the single trip multivibrator 44, of amplitudes determined by the slicer 36, and of polarities determined by the signal input pulse train. In the absence of input signal pulses, the potential of this output thus returns to zero.

Each new pulse thus generated is now applied by way of a conductor 8 to the input terminals of an elongated propagation device or delay line 9 (shown in Fig. 1) which is terminated at its far end in an absorptive impedance element 10. The pulse travels along the line and as it passes by each of a multiplicity of taps 11 which are spaced along its length it gives rise to a subsidiary pulse output at that tap. These subsidiary pulses are systematically adjusted as to their appropriate polarities and relative amplitudes, by the interposition of reversing switches 12 and attenuators 13 which are proportioned accordingly, so that the resulting amplitudes, curve C of Fig. 2, stand in precisely the same relation to each other as do the amplitudes of the pulse tail, curve B of Fig. 2, at the successive sampling instants. A valuable feature of the invention which is very important in practical applications is the fact that the proper adjustment of each subsidiary pulse path is completely independent of any and all adjustments of other subsidiary pulse paths. These adjustments of the different subsidiary pulse paths may of course be made automatically instead of manually as depicted herein.

These amplitude-adjusted and polarity-adjusted subsidiary pulses are now collected on a common conductor 14. They are next brought to the proper level for tail cancellation by an amplifier 15 and are combined subtractively with the incoming signal at the input terminal of the sampler 4. The subtraction, indicated on the drawing by a minus sign, may be accomplished by a simple electrical connection preceded by a phase inversion of the correction signal. Inasmuch as a common vacuum tube amplifier of an odd number of stages effects such a phase inversion, no further apparatus for this purpose is required other than the amplifier 15.

Figure 2:
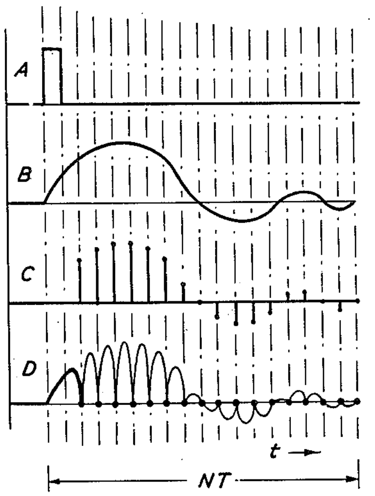
Figs. 2, 3 and 6 are wave form diagrams of assistance in explaining the operations of the invention.
Figure 3:
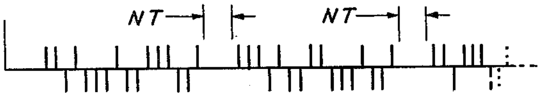

As a result of these operations, the amplitude of the incoming distorted pulse (B of Fig. 2) is exactly balanced to leave only its magnitude up to the first sampling instant, curve D of Fig. 2. Its tail has thus been entirely removed, leaving the situation clear for the identification of the following pulse, unhampered by the tail of the first. Moreover, these operations leave all the apparatus, except the delay line 9, wholly clear of the effects of the first pulse at the instant at which the following pulse is sampled and identified. By virtue of the storage properties of the delay line 9, the system is then free to carry out similar operations on this next pulse; whereupon, having done so, it is cleared of all traces of the tails of the first and second pulses and is ready to proceed with the third, and so on. The pulse output of the new pulse generator 6, thus cleared of the effects of inter-pulse interference, is delivered to a utilization circuit 16.

The unavoidable imperfections of manufactured apparatus are such that, though it may approach ideal performance, it can never quite attain it. Accordingly, the situation must be considered in which the apparatus described above may make a mistake in identifying an incoming pulse or in canceling its tail. When, to effect cancellation of a pulse tail that endures over a large number of successive pulse positions, the correction signal contains an equally large number of subsidiary pulses, an error of comparatively slight magnitude may have a disproportionately large effect on the pulses that are ultimately delivered to the utilization circuit 16. Moreover, noise in excess of half a quantum step at the time of identification may also result in a false interpretation of the particular pulse being identified, and in turn such an error is likely to cause subsequent identifications to be wrong. Over a long enough period of time, errors of these types may be encountered.

The invention makes provision for this contingency in two ways. First, the pulse train as constructed at the transmitter station may contain comparatively large subgroups or "frames" of pulses followed by regularly recurring blank spaces, as indicated in Fig. 3. These incidentally may serve as marker intervals and may be utilized to hold the receiver apparatus in synchronism with the transmitter apparatus. In addition, and provided each such blank portion is longer than a pulse tail, it gives the receiver apparatus an opportunity to clear itself of any error which may be stored in the delay line before commencing the correction of the next information-bearing pulse. The time which elapses between adjacent gaps in the pulse train may be of the order of 10,000 pulse periods or so.

If preferred, a pulse train may be generated at the transmitter station without gaps, the timing pips required for synchronization may be obtained from the mean signaling speed which is displayed by filtering the incoming noisy pulse train. In this event, and at the price of loss of a small amount of information, recurrent gaps may be inserted in the pulse train by the receiver apparatus. To this end a pulse counter 17 is provided which is operated by the timing wave source 7 and counts off its output pulses one by one, up to the number of the frame of the former alternative, whereupon the last pulse of this sequence trips a single-trip multivibrator 18 which then delivers an output pulse that opens a switch 20 in series with the principal signal path and opens a switch 20' which inhibits the new pulse generator from delivering pulses. The switches 20 and 20', which are normally closed, are each opened for the duration of the output pulse of the multivibrator 18. By well known principles of construction the duration of this pulse may be adjusted to exceed by a suitable margin of safety the time required for the delay line 9 to be fully cleared; i. e., the time required for the tail of each individual pulse to decay to an insignificant amplitude.

In the case of either alternative, the length of the pulse train or frame between successive pauses or blanks may be many times greater than the length of the blank itself. The considerations which determine the length of such frame are many and involved. There are a large number of engineering and economic conditions which govern the design and construction of any communication system, such as the available signal power, the required tolerance to errors, the time, location and manner of delivery of the signal, the statistical structure of the message, the statistical structure of the noise signals, the relative economic importance of such factors as bandwidth occupancy, signal power, cost of repeaters, cost of transmission channels, whether the communication is to be carried out on a one-way basis or a two-way basis, and so on. For any particular set of conditions for these factors, there exists an optimum length of the frame between pauses from the standpoint of minimum incidence of errors. In a typical case it may be of the order of 10,000 successive pulse periods. In the second alternative, therefore, the counter 17 delivers an output pulse to trip the multivibrator 18 for every 10,000th pulse which it receives from the timing wave source.

Meantime, while the error is stored in the apparatus and is circulating around the feedback loop 4, 5, 6, 8, 9, 14, 15, the probability is high that it will give rise at some time or other to an excessive pulse amplitude at the input terminals of the sampler 4. This is recognized by a vacuum tube voltmeter 21 whose output actuates a threshold device 22 provided for the purpose and adjusted accordingly. The output of the threshold device 22 opens a switch 23 in the outgoing line. This prevents delivery of misinformation to the utilization circuit.

In his 1928 paper, entitled "Certain topics in telegraph transmission theory," published in The Transactions of the American Institute of Electrical Engineers, vol. 37, page 617, H. Nyquist develops the proposition that for every transmission medium of bandwidth B, there is associated a limiting "signaling speed" of 2B signal elements per second, which can be exceeded only at the price of intersymbol interference. This proposition, which is wholly sound as far as it goes, has been carelessly taken by many to mean that any attempt to exceed the so-called Nyquist speed of 2B signal elements per second was foredoomed to failure. As shown by MacColl, however, in his Patent 2,056,284, if the intersymbol interference be somehow eliminated, there is no longer any theoretical upper limit to the speed of signaling. While the apparatus described above is useful over a wide range of signaling speeds, fast or slow, it is thus of especial utility when the Nyquist speed is exceeded.

Standard practice in the transmission of telephone or other signals by pulse techniques calls for the inclusion in the system, preferably at or close to its input terminals, of a channel selecting filter herein shown as a low-pass filter 3. It is the function of this filter to eliminate from the remainder of the receiver apparatus noise components having frequencies lying in a frequency range that is not of interest. This practice is preferably followed in the present invention with the further advantageous result that, when intersymbol interference is reduced in the fashion described above, this filter may have a substantially narrower pass band, and therefore may exclude substantially more noise, than is possible with systems of the more conventional variety. The considerations on which the resulting improvement of signal-to-noise ratio is based will be clear from the following example.

Figure 5:
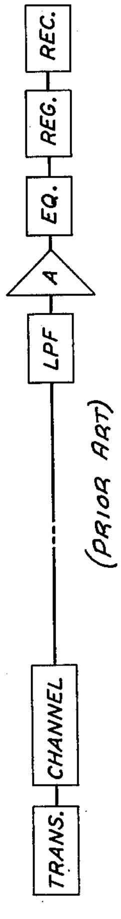
FIG. 5 (PRIOR ART)
Fig. 5 is a block schematic diagram of a conventional pulse transmission system in accordance with the prior art.

Fig. 5 shows in highly schematic form a pulse transmission system of conventional variety consisting of a transmitter, a transmission channel, an input amplifier, a low-pass filter for noise elimination, a compensating network composed of passive elements and functioning as a conventional equalizer hereinafter referred to as a static equalizer, a pulse regenerator, and a receiver. In a particular case which has been experimentally investigated the transmission channel was constituted of a 19-gauge cable 2.3 miles in length. When with this system pulses having the duration T as shown in curve A of Fig. 6 are transmitted, they are distorted by the attenuation frequency characteristic of the cable to a form more or less as shown in curve B of Fig. 6. Evidently the duration of the pulse, originally a single period T, has been prolonged to about 10 times this length. Plainly, if no further operations were carried out, it would be impossible in principle to distinguish any pulse from its immediate neighbors. Indeed, the distortion is so great that, for intelligible communication, the pulse period would have to be increased to about 6T.

However, as is well known, this situation can be much improved by the employment of a static equalizer which greatly reduces the time span of the pulse. In the particular example under consideration, an equalizer may be constructed which operates to reshape the pulse B into the form shown in the curve C of Fig. 6. The resulting pulse extends over a span of substantially 2T and, commencing at the beginning of one sampling period rises to the maximum at the end of the sampling period and falls substantially to zero magnitude at the end of the following sampling period. Evidently a pulse located in the next sampling period and indicated by the curve D can be distinguished from the pulse C for the reason that each one reaches its maximum at the instant when the amplitude of its neighbor is zero.

Figure 7:
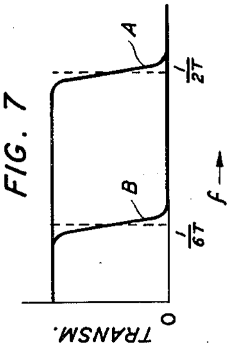
Fig. 7 is a diagram showing the improvement in the characteristic of a noise elimination filter which may be employed in conjunction with the apparatus of the invention.

From Nyquist's relation between signaling speed and filter bandwidth it follows that, to pass all of the significant frequency components of the curve C, or D, the low-pass noise exclusion filter of Fig. 5 should have a pass band extending throughout the frequency range from 0 to $$\frac{1}{2T}$$

cycles per second. Its attenuation-frequency characteristic may be as shown in curve A of Fig. 7. This filter, of course, admits noise components within this range as well as information-bearing signal components. Moreover, when the equalized pulse, curve C of Fig. 6, is amplified to compensate for the attenuation unavoidably introduced by the equalizer, all of these noise components are amplified in the same ratio.

The spectrum of the distorted pulse, curve B of Fig. 5, falls to 10 percent of its maximum low frequency value at a frequency of $$\frac{1}{6T}$$

cycles per second. Therefore, at the negligible cost of sacrificing the low amplitude higher frequency components lying outside of this range, the noise reduction input filter 3 may have a correspondingly narrower pass band. Specifically, its attenuation frequency characteristic may be as shown in the curve B of Fig. 7. It thus excludes more than two-thirds of the noise energy admitted by the filter-equalized system, Fig. 5, and the less than one-third which it admits comprises the lower frequency noise components, which are the less serious due to the action of the noise reducer described below. Thus, too, any system which permits the employment of an input noise elimination filter as shown in the curve B of Fig. 7 in place of the one shown in the curve A of Fig. 7, results in a greatly improved signal-to-noise ratio. This is rendered possible with the system of the present invention by the fact that such high frequency signal components as are required to sharpen up the incoming pulse B of Fig. 6 to such a point that it can be reliably distinguished from its neighbors are derived locally from the pulse regenerator 6 itself and not, as in the system of Fig. 5, from the incoming pulse.

As still another advantage, it is to be noted that in the system of Fig. 1 any amplification of the signal or a sample thereof, which takes place subsequent to the action of the low-pass input filter 3, applies only to such of the noise as passes through the comparatively narrow band of this filter 3, inasmuch as the major portion of the noise that lies outside of this band is highly attenuated by the filter 3.

The residual noise not eliminated in the foregoing fashion may, however, be reduced in accordance with still another feature of the invention now to be described. An auxiliary connection is made to the output point of the sampler 4 and the signal appearing here is led by way of a conductor through a delay device 24 and a buffer amplifier to an auxiliary output conductor 25. Another connection is made to the output terminal of the new pulse generator 6 and the signal appearing here is led by way of a phase-reversing device 26, another delay device 27, and a buffer amplifier to the same auxiliary output conductor 25. Thus a pulse starting at the output terminal of the sampler 4 reaches the auxiliary output conductor 25 by way of two different paths which comprise, on the one hand the element 24, and on the other hand the elements 5, 6, 26, 27.

The signal which travels by the first path is a noisy signal sample which may be designated $S+N$, where S is the true nominal magnitude of the signal at the time of sampling, all intersymbol interference from earlier signal elements having already been removed, and N is the accretion of noise. Specifically, consider the signal $S_1$ of the first sample, with its noise $N_1$. This signal, $S_1+N_1$, is delayed by the device 24, by a single pulse period T. The same noisy signal sample passes over the main path to and through the quantizer 5, 6. Now the action of the quantizer is to eliminate the noise component $N_1$, leaving only a noise-free sample of magnitude $S_1$. Although these operations require a finite time, say $\tau$, this interval of time can be substantially less than the sampling interval T. This noise-free sample $S_1$ now passes by way of the phase-reversing element 26 and the delay device 27 and buffer amplifier to the auxiliary output conductor 25. The delay introduced by the device 27 is adjusted as closely as possible to the value $T-\tau$, so that the sum of this delay and the prior one through the quantizer 5, 6 is equal to T. Thus it reaches the output conductor 25 at the same instant as does the noisy sample $S_1+N_1$, and the two are here balanced against each other to leave as the residue only the noise component $N_1$.

The instant of inception of these operations may be designated *t*, and the noise component at that instant $N(t)$. It is applied from the auxiliary output conductor 25 and with a reversal of phase introduced by an element 28 to the input point of the identifier 5, or of the entire quantizer Q, and this takes place at the next sampling instant, namely at the instant $t+T$, where T is the reciprocal of the speed of signaling and, accordingly, is the pulse repetition period or the time which elapses between sampling instants, at which time the noise is $N(t+T)$. Specifically, it has acquired the value $N_2$.

At the same instant the ensuing sample $S_2$ reaches the input terminal of the quantizer by way of the main path, accompanied by its accretion of noise, $N_2$. The noise signal $N_1$, reversed in phase, is here balanced against the noisy signal $S_2+N_2$ of the following sample. Thus $$S_2+N_2-N_1$$

A theorem of first importance in the communications art, known as the Sampling Theorem, states that any wave of which the highest significant frequency component is less than B cycles per second is completely determined by a sequence of samples of the instantaneous magnitude of the wave taken at regularly recurrent intervals, spaced $$\frac{1}{2B}$$

seconds apart, i. e., taken at a sampling rate $2B$. This theorem, believed to have originated in an unpublished memorandum of May 25, 1920, by J. R. Carson, is fully expounded by W. R. Bennett in a paper entitled "Time division multiplex systems" published in the Bell System Technical Journal for April 1941, vol. 20, page 199. It is there shown that fewer values per second as implied, for example, by a sequence of samples taken at longer intervals fail to determine the wave fully, and that a sequence of samples taken at shorter intervals are partly redundant, that is to say, they are not completely independent of each other. All of these considerations apply to waves in general, whatever their nature and origin, and therefore to noise waves in particular.

As explained above in connection with the discussion of the input noise reduction filter, its pass band may extend from zero frequency to a frequency of $$\frac{1}{kT}$$

cycles per second, specifically, in the example selected, to the frequency of $$\frac{1}{6T}$$

cycles per second. The pulse repetition rate $$\frac{1}{T}$$

of the system exceeds the double bandwidth $$\frac{2}{6T}$$

of the filter, so that the "Nyquist signaling speed" is exceeded. Therefore, by the sampling theorem, there exists at least some correlation or interdependency between the noise accompanying any pulse and the noise accompanying its nearest neighbors.

It is this very interdependency which holds as between successive noise samples, which may be taken at a rate in excess of 2B, and which in any event are taken at a rate in excess of twice the highest noise frequency component, which the present invention turns to account. For since the difference of two quantities between which such a relation holds is of a smaller magnitude than either of them alone, $$N_2-N_1=\Delta N$$

and therefore $$S_2+N_2-N_1=S_2+\Delta N$$

These operations are repeated for every sample, and the end result is a reduction of the noise $N_n$ associated with any signal sample $S_n$ from its original value $N_n$ to a lesser value $\Delta N_n$.

In a regenerative system such as the present one, the signal can always be recognized and regenerated provided the noise at the input terminals of the quantizer does not exceed one half quantum step. By virtue of the noise reduction described above, the noise as it appears at the input terminals of the receiver as a whole, and in particular at the input terminals of the sampler, may be considerably in excess of this value. For example, with a noise reduction of two-to-one, the noise at the input terminals of the sampler may be as great as a whole quantum step.

What is claimed is:

1. In combination with a source of a train of pulses which are quantized in amplitude and a transmission medium through which they are transmitted, said medium having a distorting transmission frequency characteristic such as to prolong the pulse sent in any pulse interval into adjacent pulse intervals and thus to cause interference between neighboring ones of said pulses, means for reducing said interpulse interference which comprises means for regenerating pulses in amplitude and in time of occurrence, means for deriving from said regenerated pulses a medium-distortion-correction wave, said correction wave deriving means comprising an elongated propagation device having an input terminal, means for applying each said regenerated pulse to said input terminal, a plurality of output terminals spaced along its length, means for adjusting the relative amplitudes of signals derived from said several output terminals, means for combining said amplitude-adjusted signals to provide said correction wave, means for differentially combining said correction wave with said incoming train to provide a difference signal, and means for applying said difference signal to said regenerating means.

2. In combination with apparatus as defined in claim 1, means coupled to the pulse regenerator for intermittently disabling it for a number of successive pulse intervals in excess of the number into which each pulse is prolonged.

3. In combination with apparatus as defined in claim 1, a utilization circuit, a transmission path coupling said regenerating means to said utilization circuit, and incoming pulse amplitude controlled means for disabling said path upon the occurrence of a pulse of excessive amplitude.

4. In combination with a source of a train of pulses which are quantized in amplitude and a transmission medium through which they are transmitted, said medium having a known transmission frequency characteristic and so operating to distort said pulses and thus to cause interference between neighboring ones of said pulses, means for reducing said interpulse interference which comprises a source of regularly recurrent timing pulses, means operative only on the coincidence of a timing pulse with an incoming pulse of said train for generating a new pulse of standard amplitude, means for deriving from each of said new pulses a medium-distortion-correction wave, said correction wave deriving means comprising an elongated propagation device having an input terminal, means for applying said new pulse to said input terminal, a plurality of output terminals spaced along its length, means for adjusting the relative amplitudes of signals derived from said several output terminals, means for combining said amplitude-adjusted signals to provide said correction wave, means for differentially combining said correction wave with said incoming train to provide a difference signal, and means for applying said difference signal to said regenerating means.

5. In combination with a source of a train of pulses which are quantized in amplitude and a transmission medium through which they are transmitted, said medium having a known transmission frequency characteristic and so operating to distort said pulses and thus to cause interference between neighboring ones of said pulses, means for reducing said interpulse interference which comprises signal sampling means having an input terminal, sample quantizing means, and a new pulse generator having an output terminal, coupled together in tandem in the order named, an elongated propagation device having an input terminal connected to the output terminal of said new pulse generator and having a plurality of output terminals spaced along its length, means for adjusting the relative amplitudes of signals derived from said several output terminals, means for combining said amplitude-adjusted signals to provide a correction wave, means for differentially combining said correction wave with said incoming train to provide a difference signal, and means for applying said difference signal to said signal-sampling means.

6. In combination with a source of a train of pulses which are quantized in amplitude and a transmission medium through which they are transmitted, said medium having a known transmission frequency characteristic and so operating to distort said pulses and thus to cause interference between neighboring ones of said pulses, means for reducing said interpulse interference which comprises signal sampling means having an input terminal, sample quantizing means, and a new pulse generator having an output terminal, coupled together n tandem in the order named, an elongated propagation device having an input terminal connected to the output terminal of said new pulse generator and having a plurality of output terminals spaced along its length, means for adjusting the relative amplitudes of pulses derived from said several output terminals, means for differentially combining said amplitude-adjusted pulses in turn with said incoming train to provide a difference signal, and means for applying said difference signal to said signal-sampling means.

7. In a system for high-speed signaling by regularly recurring quantized pulses over a channel which degrades said pulses by the addition thereto of noise having significant components at frequencies of and below the pulse recurrence rate, apparatus for reducing the degrading effects of such noise in the course of said transmission which comprises quantizing means having input terminals and output terminals for reducing each signal applied to it to that one of a restricted integral number of different discrete magnitudes that is most nearly like that of the applied signal, means for deriving from an incoming noisy pulse a first auxiliary signal that is proportional to said incoming noisy pulse, means for deriving a noise-free second auxiliary signal from the output terminals of said quantizing means, means for balancing said second auxiliary signal against said first auxiliary signal to provide a signal-free noise pulse, means for applying incoming noisy signal pulses to the input terminals of said quantizing means, and means for also applying said signal-free noise pulse to said input terminals in opposition to said noisy signal pulses.

8. In a system for high-speed signaling by regularly recurring quantized pulses over a channel which degrades said pulses by the addition thereto of noise having significant components at frequencies of and below the pulse recurrence rate, apparatus for reducing the degrading effects of such noise in the course of said transmission which comprises signal sampling means, quantizing means having input terminals and output terminals for reducing each signal sample applied to it to that one of a restricted integral number of different discrete magnitudes that is most nearly like that of the applied signal, means for deriving at each sampling instant a first auxiliary signal which is proportional to an incoming noisy pulse, means for deriving a noise-free second auxiliary signal from the output terminals of said quantizing means, said second signal being thus a measure of the nominal magnitude of said incoming noisy pulse, means for balancing said second auxiliary signal against said first auxiliary signal to provide a signal-free noise pulse, means for applying an incoming noisy signal pulse to the input terminals of said quantizing means at each sampling instant, and means for simultaneously applying to said input terminals, and in opposition to said noisy signal pulse, the signal-free noise pulse derived from that noisy pulse which was incoming at the prior sampling instant.

9. The method of receiving timed quantized pulses transmitted over a medium which produces linear distortion in transmitted waves such that the arrival wave resulting from a sent impulse is prolonged beyond the time interval allotted to the sent impulse and over into the time interval allotted to the next sent impulse which comprises deriving a sample of said wave during said allotted interval, quantizing said sample to that one of a restricted integral number of different discrete magnitudes that is most nearly like that of said sample, generating a pulse of standard width and of said one discrete magnitude, deriving from said standard pulse a plurality of compensatory pulses having amplitudes which are severally equal to the magnitudes of said arrival wave in the several time intervals into which it is prolonged, and applying said compensatory pulses in opposition to the prolonged portion of said arrival wave.

10. In the art of high-speed signalling by quantised pulses over a noisy channel of bandwidth B and at a rate in excess of 2B pulses per second, the method of reducing the degrading effects of noise gathered by said pulses in the course of transmission over said channel which comprises sampling incoming noisy pulses at each of a regular succession of sampling instants to provide noisy pulse samples, quantizing each said noisy pulse sample to one of a restricted integral number of different discrete magnitudes to provide a noise-free pulse sample, balancing said noisy pulse sample against said noise-free pulse sample to derive a signal-free noise pulse, and balancing said signal-free noise pulse against the noisy pulse sample derived at the next following sampling instant.

11. In combination with a source of a train of pulses which are quantized in amplitude and a transmission medium through which they are transmitted, said medium having a known transmission characteristic and so operating to draw out the trailing edge of each of said pulses into a tail which is prolonged over a number of successive pulse periods and thus to cause interference between neighboring ones of said pulses, means for reducing said interpulse interference which comprises means for deriving a brief sample of the magnitude of an incoming train of said pulses at a sampling instant, means for quantizing said sample to that one of a preassigned plurality of discrete values which it most nearly resembles, means for generating a first order new pulse of amplitude proportional to said quantized sample, means for deriving from said first order new pulse a plurality of second order new pulses, the number of said plurality being equal to said number of successive pulse periods over which said tail is prolonged, means for individually adjusting the amplitudes of said second order new pulses to equality with the contribution of said tail to said incoming train at each of said successive pulse periods, means for bringing said second order new pulses into phase coincidence with said contributions from said tails at successive ones of said sampling instants, and means for differentially combining said adjusted second order pulses with said incoming train of pulses, thereby to nullify said tail at each of said successive sampling instants.

12. In combination with a source of a train of pulses which are quantized in amplitude and a transmission medium through which they are transmitted, said medium having a distorting transmission characteristic such as to draw out the trailing edge of each of said pulses into a tail which is prolonged over a number of successive pulse periods and thus to cause interference between neighboring ones of said pulses, means for reducing said interpulse interference which comprises means for deriving a brief sample of the magnitude of an incoming train of said pulses at the earliest instant following the arrival of the leading edge of an incoming pulse at which said pulse can be unambiguously identified, means for quantizing said sample to that one of a preassigned plurality of discrete values which it most nearly resembles, means for generating a first order new pulse of amplitude proportional to said quantized sample, means for deriving from said first order new pulse a plurality of second order new pulses, the number of said plurality being equal to said number of successive pulse periods over which said tail is prolonged, means for individually adjusting the amplitudes of said second order new pulses to equality with the contribution of said tail to said incoming train at each of said successive pulse periods, means for bridging said second order new pulses into phase coincidence with said contributions from said tails at successive ones of said sampling instants, and means for differentially combining said adjusted second order pulses with said incoming train of pulses, thereby to nullify said tail at each of said successive sampling instants.

13. In combination with a source of a train of pulses which are quantized in amplitude and a transmission medium through which they are transmitted, said medium having a known transmission characteristic and so operating to draw out the trailing edge of each of said pulses into a tail which is prolonged over a number of successive pulse periods and thus to cause interference between neighboring ones of said pulses, means for reducing said interpulse interference which comprises means for deriving a brief sample of the magnitude of an incoming train of said pulses at an instant following the inception of an incoming pulse at which the ratio of the magnitude of said pulse to the sum of the magnitudes of early portions of other pulses is a maximum, means for quantizing said sample to that one of a preassigned plurality of discrete values which it most nearly resembles, means for generating a first order new pulse of amplitude proportional to said quantized sample, means for deriving from said first order new pulse a plurality of second order new pulses, the number of said plurality being equal to said number of successive pulse periods over which said tail is prolonged, means for individually adjusting the amplitudes of said second order new pulses to equality with the contribution of said tail to said incoming train at each of said successive pulse periods, means for bringing said second order new pulses into phase coincidence with said contributions from said tails at successive ones of said sampling instants, and means for differentially combining said adjusted second order pulses with said incoming train of pulses, thereby to nullify said tail at each of said successive sampling instants.

14. In combination with a source of a train of pulses which are quantized in amplitude and a transmission medium through which they are transmitted, said medium having a known transmission characteristic and so operating to draw out the trailing edge of each of said pulses into a tail which is prolonged over a number of successive pulse periods and thus to cause interference between neighboring ones of said pulses, means for reducing said interpulse interference which comprises means for deriving a brief sample of the magnitude of an incoming train of said pulses at a sampling instant, means for quantizing said sample to that one of a preassigned plurality of discrete values which it most nearly resembles, means for generating a first order new pulse of amplitude proportional to said quantized sample, means for deriving from said first order new pulse a plurality of second order new pulses, the number of said plurality being equal to said number of successive pulse periods into which said tail is prolonged, means for adjusting the duration of each of said second order new pulses to a duration in excess of the duration of said brief sample and less than the time interval between successive sampling instants, means for individually adjusting the amplitudes of said second order new pulses to equality with the contribution of said tail to said incoming train at each of said successive pulse periods, means for bringing said second order new pulses into phase coincidence with said contributions from said tails at successive ones of said sampling instants, and means for differentially combining said adjusted second order pulses with said incoming train of pulses, thereby to nullify said tail at each of said successive sampling instants.

15. In combination with a source of a train of pulses, each of which occupies one of a succession of pulse periods of duration T, said periods recurring regularly at a rate $$\frac{1}{T}$$

and a transmission channel through which said pulses are transmitted, said channel having a pronounced attenuation-frequency characteristic and operating to prolong each of said pulses substantially over a number $(k-1)$ of adjacent pulse periods and thus to cause interference between neighboring ones of said pulses, means for reducing the effects of noise gathered by said pulses in the course of said transmission and for reducing said interpulse interference, which comprises a low pass filter proportioned to have a high frequency cutoff at the frequency $$\frac{1}{2kT}$$

and adapted to pass significant frequency components below this frequency and substantially to block frequency components above this frequency, whereby the significant portions of each of said prolonged pulses are passed by said filter, and means connected to the output terminals of said filter for canceling the portion of each of said pulses which is prolonged into adjacent pulse periods, whereby each of said pulses is recognizable despite the prolonged tails of its predecessors.

16. In combination with apparatus as defined in claim 15, means for reducing the effects of noise components of such frequencies as pass said filter.

17. Apparatus as defined in claim 15, wherein said noise reducing means comprises signal sampling means, sample quantizing means, and a new pulse generator, coupled together in the order named, means for balancing a noisy pulse incoming at one sampling instant against a noise-free quantized pulse derived from said incoming pulse by said quantizing means, to derive a noise signal, and means for balancing said noise signal against a noisy pulse incoming at the next sampling instant, thereby to reduce the noise which accompanies said last-named incoming pulse.

18. In combination with a source of a train of pulses and a transmission channel through which said pulses are transmitted to a receiver station and in which they gather noise, each of said pulses occupying one of a succession of pulse periods of duration T, said periods recurring regularly at a rate $$\frac{1}{T}$$

said pulse train thus normally requiring for transmission, reception and unambiguous interpretation a channel having a transmission band extending from zero frequency to an upper frequency B, means at said receiver station for reducing the effects of such noise which comprises a filter having a passband extending from zero frequency to a frequency $$\frac{B}{k}$$

$k$ being a factor greater than unity, means for applying an incoming train of said pulses to said filter, said filter being operative to remove from said train substantially all noise components of frequencies in excess of $$\frac{B}{k}$$

said filter being simultaneously operative to prolong each of said pulses over a number $k$—1 of adjacent pulse periods and thus to cause potential interference between neighboring ones of said pulses, means for withdrawing a signal from said filter which thus comprises a train of prolonged but relatively noise-free pulses, and means connected to the output terminals of said filter for canceling the portion of each of said pulses which is prolonged into adjacent pulse periods, whereby each of said pulses is recognizable despite the prolongation of its predecessors.

19. In combination with apparatus as defined in claim 18, means for reducing the effects of noise components of such frequencies as pass said filter.

20. Apparatus as defined in claim 19, wherein said noise reducing means comprises signal sampling means, sample quantizing means, and a new pulse generator, coupled together in the order named, means for balancing a noisy pulse incoming at one sampling instant against a noise-free quantized pulse derived from said incoming pulse by said quantizing means, to derive a noise signal, and means for balancing said noise signal against a noisy pulse incoming at the next sampling instant, thereby to reduce the noise which accompanies said last-named incoming pulse.

References Cited in the file of this patent

UNITED STATES PATENTS

| | | |
|---|---|---|
| 2,617,879 | Sziklai | Nov. 11, 1952 |
| 2,662,113 | Schouten et al. | Dec. 8, 1953 |
| 2,669,608 | Goodall | Feb. 16, 1954 |